(12) United States Patent
Park et al.

(10) Patent No.: US 11,694,707 B2
(45) Date of Patent: Jul. 4, 2023

(54) ONLINE TARGET-SPEECH EXTRACTION METHOD BASED ON AUXILIARY FUNCTION FOR ROBUST AUTOMATIC SPEECH RECOGNITION

(71) Applicant: INDUSTRY-UNIVERSITY COOPERATION FOUNDATION SOGANG UNIVERSITY, Seoul (KR)

(72) Inventors: Hyung Min Park, Seoul (KR); Uihyeop Shin, Changwon-si (KR)

(73) Assignee: INDUSTRY-UNIVERSITY COOPERATION FOUNDATION SOGANG UNIVERSITY, Seoul (KR)

( * ) Notice: Subject to any disclaimer, the term of this patent is extended or adjusted under 35 U.S.C. 154(b) by 162 days.

(21) Appl. No.: 17/215,501

(22) Filed: Mar. 29, 2021

(65) Prior Publication Data

US 2021/0217434 A1 Jul. 15, 2021

Related U.S. Application Data

(63) Continuation-in-part of application No. 16/849,321, filed on Apr. 15, 2020, now Pat. No. 10,991,362, which is a continuation-in-part of application No. 16/181,798, filed on Nov. 6, 2018, now Pat. No.
(Continued)

(30) Foreign Application Priority Data

Mar. 18, 2015 (KR) .......................... 10-2015-0037314

(51) Int. Cl.
*G10L 21/0272* (2013.01)
*G10L 21/0308* (2013.01)
(Continued)

(52) U.S. Cl.
CPC .... *G10L 21/0272* (2013.01); *G06F 18/21342* (2023.01); *G10L 15/20* (2013.01);
(Continued)

(58) Field of Classification Search
None
See application file for complete search history.

(56) References Cited

U.S. PATENT DOCUMENTS 9,093,079 B2 * 7/2015 Kleffner .............. G10L 21/0272
2005/0060142 A1 3/2005 Visser et al.
(Continued)

FOREIGN PATENT DOCUMENTS

JP 2008219458 9/2008
KR 20030078218 10/2003
(Continued)

OTHER PUBLICATIONS

Matsuoka, Minimal Distortion Principle for Blind Source Separation, Aug. 5-7, 2002, SICE, pp. 2138-2143.

*Primary Examiner* — Shaun Roberts
(74) *Attorney, Agent, or Firm* — Cantor Colburn LLP

(57) ABSTRACT

A target speech signal extraction method for robust speech recognition includes: initializing a steering vector for a target speech source and an adaptive vector, setting a real output channel of the target speech source as an output by the adaptive vector, initializing adaptive vectors for a noise and setting a dummy channel as an output by the adaptive vectors for the noise; setting a cost function for minimizing dependency between a real output for the target speech source and a dummy output for the noise; setting an auxiliary function to the cost function, and updating the adaptive vector for the target speech source and the adaptive vectors for the noise by using the auxiliary function and the steering vector; estimating the target speech signal by using the adaptive vector thereby extracting the target speech signal from the input signals; and updating the steering vector for the target speech source.

9 Claims, 13 Drawing Sheets

Related U.S. Application Data 10,657,958, which is a continuation-in-part of application No. 15/071,594, filed on Mar. 16, 2016, now abandoned.

(51) Int. Cl.
*G10L 15/20* (2006.01)
*G10L 21/0216* (2013.01)
*G06F 18/2134* (2023.01)
*G10L 21/0208* (2013.01)

(52) U.S. Cl.
CPC ...... *G10L 21/0208* (2013.01); *G10L 21/0216* (2013.01); *G10L 21/0308* (2013.01)

(56) References Cited

U.S. PATENT DOCUMENTS

| | | |
|---|---|---|
| 2005/0203981 A1 | 9/2005 | Sawada et al. |
| 2006/0015331 A1 | 1/2006 | Hui et al. |
| 2006/0058983 A1 | 3/2006 | Araki et al. |
| 2009/0012779 A1* | 1/2009 | Ikeda .................. G10L 21/0272 704/205 |
| 2009/0055170 A1 | 2/2009 | Nagahama |
| 2009/0150146 A1 | 6/2009 | Cho et al. |
| 2009/0222262 A1 | 9/2009 | Kim et al. |
| 2011/0131044 A1 | 6/2011 | Fukuda et al. |
| 2012/0020485 A1 | 1/2012 | Visser et al. |
| 2012/0263315 A1* | 10/2012 | Hiroe .................. G10L 21/0216 381/92 |
| 2014/0163991 A1 | 6/2014 | Short et al. |

FOREIGN PATENT DOCUMENTS

| | | |
|---|---|---|
| KR | 20060044008 | 5/2006 |
| KR | 100647826 | 11/2006 |
| KR | 20090081263 | 7/2009 |

* cited by examiner

| value to be computed | proposed method | real-time FD ICA |
|---|---|---|
| $\mathbf{y}$ or $\mathbf{u}$ | $K(2M-1)$ | $KM^2$ |
| $\phi(Y(k,\tau))$ or $\phi(\mathbf{u}(k,\tau))$ | $2K$ | $2KM$ |
| $\xi$ | $K(M+2)$ | $K(M+2)$ |
| $\Delta\mathbf{w}$ or $\Delta\mathbf{W}$ | $2KM$ | $K(M^3+M^2-M)$ |
| MDP | $KM$ | $K(M+O(M^3)^*)$ |
| total | $K(6M+3)$ | $K(M^3+2M^2+3M+2+O(M^3))$ |

* the number of operations for matrix inversion

One interference and $RT_{60}$ of 0.2 s.

One interference and $RT_{60}$ of 0.4 s.

One interference and $RT_{60}$ of 0.6 s.

Two interferences and $RT_{60}$ of 0.2 s

Two interferences and $RT_{60}$ of 0.4 s.

Two interferences and $RT_{60}$ of 0.6 s.

Three interferences and $RT_{60}$ of 0.2 s.

Three interferences and $RT_{60}$ of 0.4 s.

Three interferences and $RT_{60}$ of 0.6 s.

Subway noise and $RT_{60}$ of 0.2 s.

Subway noise and $RT_{60}$ of 0.4 s.

Subway noise and $RT_{60}$ of 0.6 s.

(d) Car noise and $RT_{60}$ of 0.2 s.

Car noise and $RT_{60}$ of 0.4 s.

Car noise and $RT_{60}$ of 0.6 s.

Exhibition hall noise and $RT_{60}$ of 0.2 s.

Exhibition hall noise and $RT_{60}$ of 0.4 s.

Exhibition hall noise and $RT_{60}$ of 0.6 s.

ONLINE TARGET-SPEECH EXTRACTION METHOD BASED ON AUXILIARY FUNCTION FOR ROBUST AUTOMATIC SPEECH RECOGNITION

BACKGROUND OF THE INVENTION

1. Field of the Invention

The present invention relates to a pre-processing method for target speech extraction in a speech recognition system or a speech recognition apparatus, and more particularly, a target speech extraction method capable of reducing a calculation amount and improving performance of speech recognition by performing independent component analysis by using information on a direction of arrival of a target speech source or a steering vector for the target speech source.

2. Description of the Prior Art

With respect to an automatic speech recognition (ASR) system, since much noise exists in real environments, noise robustness is very important to maintain. In many cases, degradation in performance of recognition of the speech recognition system are mainly caused from a difference between a learning environment and the real environment.

In general, in the speech recognition system, in a pre-processing step, a clear target speech signal which is a speech signal of a target speaker is extracted from input signals supplied through input means such as a plurality of microphones, and the speech recognition is performed by using the extracted target speech signal. In speech recognition systems, various types of pre-processing methods of extracting the target speech signal from the input signals are proposed.

In a speech recognition system using independent component analysis (ICA) of the related art, outputs signals as many as the input signals of which the number corresponds to the number of microphones are extracted, and one target speech signal is selected from the output signals In this case, in order to select the one target speech signal from the output signals of which the number corresponds to the number of input signals, a process of identifying which direction each of the output signals are input from is required, and thus, there are problems in that a calculation amount is overloaded and the entire performance is degraded due to error in estimation of the input direction.

In a blind spatial subtraction array (BSSA) method of the related art, after a target speech signal output is removed, a noise power spectrum estimated by ICA using a projection-back method is subtracted. In this BSSA method, since the target speech signal output of the ICA still includes noise and the estimation of the noise power spectrum cannot be perfect, there is a problem in that the performance of the speech recognition is degraded.

On the other hand, in a semi-blind source estimation (SBSE) method of the related art, some preliminary information such as direction information is used for a source signal or a mixing environment. In this method, known information is applied to generation of a separating matrix for estimation of the target signal, so that it is possible to more accurately separate the target speech signal. However, since this SBSE method requires additional transformation of input mixing vectors, there are problems in that the calculation amount is increased in comparison with other methods of the related art and the output cannot be correctly extracted in the case where preliminary information includes errors. On the other hand, in a real-time independent vector analysis (IVA) method of the related art, permutation problem across frequency bins in the ICA is overcome by using a statistic model considering correlation between frequencies. However, since one target speech signal needs to be selected from the output signals, problems exist in the ICA or the like.

SUMMARY OF THE INVENTION

The present invention is to provide a method of accurately extracting a target speech signal with a reduced calculation amount by using information on a direction of arrival of a target speech source or a steering vector for the target speech source.

According to an aspect of the present invention, there is provided a target speech signal extraction method of extracting the target speech signal from the input signals input to at least two or more microphones, the target speech signal extraction method including: (a) initializing a steering vector fora target speech source and an adaptive vector $w_1(k)$ for the target speech source, setting a real output channel of the target speech source as an output by the adaptive vector for the target speech source, initializing adaptive vectors $w_2(k), \ldots w_M(k)$ fora noise and setting a dummy channel as an output by the adaptive vectors for the noise; (b) setting a cost function for minimizing dependency between a real output for the target speech source and a dummy output for the noise using independent component analysis (ICA) or independent vector analysis (IVA); (c) setting an auxiliary function to the cost function, and updating the adaptive vector $w_1(k)$ for the target speech source and the adaptive vectors $w_2(k), \ldots, w_M(k)$ for the noise by using the auxiliary function and the steering vector for the target speech source; (d) estimating the target speech signal by using the adaptive vector for the target speech source thereby extracting the target speech signal from the input signals; and (e) updating the steering vector for the target speech source, and wherein the (b)~(e) are executed repeatedly; and wherein the auxiliary function is set an inequality relation so that the auxiliary function has always values greater than or same as that of the cost function.

In the target speech signal extraction method according to the above aspect, preferably, the (e) includes of (e1) estimating a target mask which is defined a value representing a ratio of a target speech signal power to a sum of the target speech signal power and a noise signal power; (e2) estimating covariance matrix for the target speech source using the estimated target mask; (e3) obtaining a principal eigen vector by eigen-vector decomposing the estimated covariance matrix; and (e4) estimating the steering vector from the principal eigen vector to update the steering vector.

In the target speech extraction method according to the present invention, in a speech recognition system, a target speech signal can be allowed to be extracted from input signals by using information of a target speech direction of arrival which can be supplied as preliminary information, and thus, the total calculation amount can be reduced in comparison with the extraction methods of the related art, so that a process time can be reduced.

The present invention is to provide a non-transitory computer readable storage media having program instructions that, when executed by a processor of a speech recognition apparatus or a speech recognition system, cause

DETAILED DESCRIPTION OF THE INVENTION

The present invention relates to a target speech signal extraction method for robust speech recognition and a speech recognition pre-processing system employing the aforementioned target speech signal extraction method, and independent component analysis is performed in the assumption that a target speaker direction is known or by using an estimated steering vector for a target speech source, so that a total calculation amount of speech recognition can be reduced and fast convergence can be performed.

Hereinafter, a pre-processing method for robust speech recognition according to an exemplary embodiment of the present invention will be described in detail with reference to the attached drawings.

The present invention relates to a pre-processing method of a speech recognition system for extracting a target speech signal of a target speech source that is a target speaker from input signals input to at least two or more microphones. The method includes receiving information on a direction of arrival of the target speech source with respect to the microphones; generating a nullformer by using the information on the direction of arrival of the target speech source to remove the target speech signal from the input signals and to estimate noise; setting a real output of the target speech source using an adaptive vector w(k) as a first channel and setting a dummy output by the nullformer as a remaining channel; setting a cost function for minimizing dependency between the real output of the target speech source and the dummy output using the nullformer by performing independent component analysis (ICA); and estimating the target speech signal by using the cost function, thereby extracting the target speech signal from the input signals.

In a target speech signal extraction method according to the exemplary embodiment of the present invention, a target speaker direction is received as preliminary information, and a target speech signal that is a speech signal of a target speaker is extracted from signals input to a plurality of (M) microphones by using the preliminary information.

Figure 1:
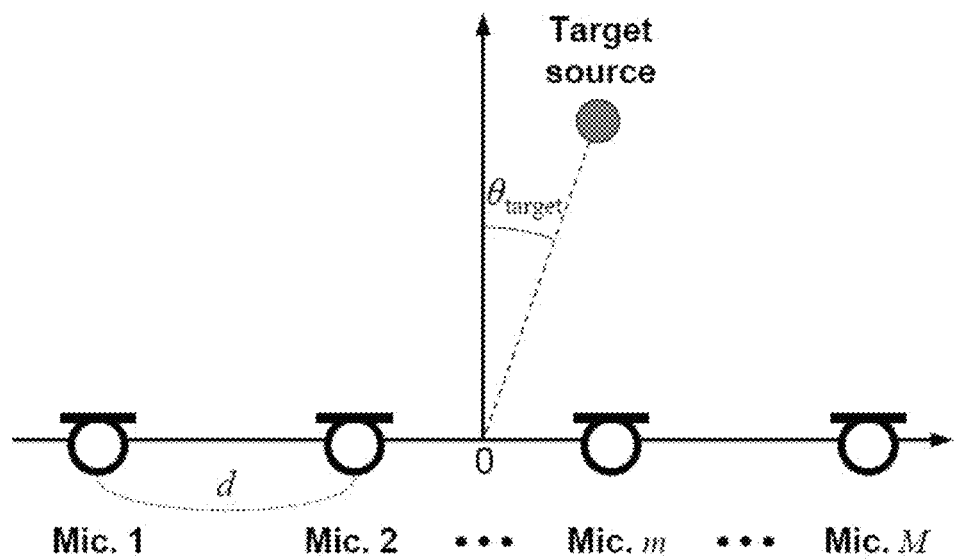
FIG. 1 is a configurational diagram illustrating a plurality of microphones and a target source in order to explain a target speech extraction method for robust speech recognition according to the present invention.

FIG. 1 is a configurational diagram illustrating a plurality of microphones and a target source in order to explain a target speech extraction method for robust speech recognition according to the present invention. Referring to FIG. 1, set are a plurality of the microphones Mic.1, Mic.2, ..., Mic.m, and Mic.M and a target speech source that is a target speaker. A target speaker direction that is a direction of arrival of the target speech source is set as a separation angle $\theta_{target}$ between a vertical line in the front direction of a microphone array and the target speech source.

In FIG. 1, an input signal of an m-th microphone can be expressed by Mathematical Formula 1.

[Mathematical Formula 1]

$$X_m(k, \tau) = [A(k)]_{m1} S_1(k, \tau) + \sum_{n=2}^{N} [A(k)]_{mn} S_n(k, \tau)$$

Herein, k denotes a frequency bin number and $\tau$ denotes a frame number. $S_1(k,\tau)$ denotes a time-frequency segment of a target speech signal constituting the first channel, and $S_n(k,\tau)$ denotes a time-frequency segment of remaining signals excluding the target speech signal, that is, noise estimation signals. A(k) denotes a mixing matrix in a k-th frequency bin.

In a speech recognition system, the target speech source is usually located near the microphones, and acoustic paths between the speaker and the microphones have moderate reverberation components, which means that direct-path components are dominant. If the acoustic paths are approximated by the direct paths and relative signal attenuation among the microphones is negligible assuming proximity of the microphones without any obstacle, a ratio of target speech source components in a pair of microphone signals can be obtained by using Mathematical Formula 2.

[Mathematical Formula 2]

$$\frac{[A(k)]_{m1} S_1(k, \tau)}{[A(k)]_{m'1} S_1(k, \tau)} \approx \exp\left\{j\omega_k \frac{d(m - m')\sin\theta_{target}}{c}\right\}$$

Herein, $\theta_{target}$ denotes the direction of arrival (DOA) of the target speech source. Therefore, a "delay-and-subtract nullformer" that is a nullformer for canceling out the target speech signal from the first and m-th microphones can be expressed by Mathematical Formula 3.

[Mathematical Formula 3]

$$Y_m(k, \tau) = X_m(k, \tau) - \exp\left\{j\omega_k \frac{d(m - 1)\sin\theta_{target}}{c}\right\} X_1(k, \tau) \, m = 2, \ldots, M$$

The nullformer obtains the relative ratio of target speech signals by using the information on the direction of arrival of the target speech source, multiplies the relative ratio and an input signal of a microphone and subtracts the multiplied value from input signals of a pair of microphones so that the nullformer is configured for canceling out the target speech source component from the input signal of a microphone.

In order to derive a learning rule, the nullformer outputs are regarded as dummy outputs, and the real target speech output is expressed by Mathematical Formula 4.

$$Y_1(k,\tau)=w_1^H(k)x(k,\tau) \qquad \text{[Mathematical Formula 4]}$$

Herein, H denotes the Hermitian transpose and $w_1(k)$ denotes the adaptive vector for generating the real output. Therefore, the real output and the dummy output can be expressed in a matrix form by Mathematical Formula 5.

$$y(k, \tau) = \begin{bmatrix} w_1^H(k) \\ -y_k \mathbb{I} \end{bmatrix} x(k, \tau) \qquad \text{[Mathematical Formula 5]}$$

Herein, $$y(k, \tau) = \begin{bmatrix} w_1^H(k) \\ -y_k \mathbb{I} \end{bmatrix} x(k, \tau),$$

$$y_k = [\Gamma_k^1, \ldots, \Gamma_k^{M-1}]^T, \text{ and}$$

$$\Gamma_k = \exp\{j\omega_k d \sin\theta_{target}/c\}.$$

Nullformer parameters for generating the dummy output are fixed to provide noise estimation. As a result, according to the present invention, permutation problem over the frequency bins can be solved. Unlike an TVA method, the estimation of $w_1(k)$ at a frequency bin independent of other frequency bins can provide fast convergence, so that it is possible to improve performance of target speech signal extraction as pre-processing for the speech recognition system.

Therefore, according to the present invention, by maximizing independency between the real output and the dummy output at one frequency bin, it is possible to obtain a desired target speech signal from the real output.

According to the present invention, a method of estimating a steering vector h (k) for the target speech source can be proposed. Similar to the Mathematical Formula 1, $S_1(k,\tau)$ and $S_m(k,\tau), m \geq 2$ denote a target speech source and a noise, respectively. A target mask $\mathcal{M}(k,\tau)$ is defined as a ratio of a power of the target speech source to a power of an input signal $\mathcal{M}(k,\tau)$ in which the target speech source and the noise are mixed.

$$\mathcal{M}(k, \tau) = \frac{|S_1(k, \tau)|^2}{\sum_{m=1}^{M} |S_m(k, \tau)|^2}$$

However, the target speech source and the noise can be estimated by the output signal which is calculated by the mathematical formula 5 using the output channel and the dummy channel.

$$\text{diag}(W^{-1}(k))y(k, \tau) = \begin{bmatrix} \hat{S}_1(k, \tau) \\ \vdots \\ \hat{S}_M(k, \tau) \end{bmatrix}$$

The diag($W^{-1}(k)$) is a value of calibrating the scale of the output signal and is obtained by calculating the inverse matrix $W^{-1}(k)$ of demixing matrix and using a diagonal matrix diag(•) with the off-diagonal element of the inverse matrix being zero.

Therefore, the target mask can be estimated as follows.

$$\hat{\mathcal{M}}(k, \tau) = \frac{|\hat{S}_1(k, \tau)|^2}{\sum_{m=1}^{M} |\hat{S}_m(k, \tau)|^2}$$

The covariance matrix for the target speech source can be estimated by using the estimated target mask.

$$\hat{R}_s(k) = \frac{1}{\sum_\tau \hat{\mathcal{M}}(k, \tau)} \sum_\tau \hat{\mathcal{M}}(k, \tau) x(k, \tau) x^H(k, \tau)$$

Therefore, the steering vector for the target speech source can be estimated by the principal eigenvector which is obtained by eigen-value decomposing the estimated target spatial covariance matrix.

The steering vector can be estimated directly and stably without estimating the direction for target speech source.

The estimation of a steering vector can be estimated in on-line by updating $h^H(f; \tau)$ in real-time.

$$\text{diag}(A(k, \tau))y(k, \tau) = \begin{bmatrix} \hat{S}_1(k, \tau) \\ \vdots \\ \hat{S}_M(k, \tau) \end{bmatrix}$$

The diag($W^{-1}(k)$) is a value calibrating a scale of the output signal and can use the inverse matrix A(k) of the demixing matrix being updated continuously. Therefore, the target mask can be estimated by using the equation.

$$\mathcal{M}(k, \tau) = \frac{|S_1(k, \tau)|^2}{\sum_{m=1}^{M} |S_m(k, \tau)|^2}$$

The covariance matrix for target speech source can be updated in real-time by using the estimated target mask, a smoothing factor and the moving average.

$$\hat{R}_s(k;\tau) = \alpha \hat{R}_s(k;\tau-1) + (1-\alpha)\hat{\mathcal{M}}(k,\tau)x(k,\tau)x^H(k,\tau)$$

Therefore, the steering vector for the target speech source can be estimated in on-line and in real-time by the principal eigenvector which is obtained by eigen-value decomposing the estimated target spatial covariance matrix.

With respect to the cost function, by Kullback-Leibler (KL) divergence between probability density functions p($Y_1$(k,τ), $Y_2$(k,τ), ∩∩∩, $Y_M$(k,τ)) and q($Y_1$(k,τ))p($Y_2$(k,τ), ∩∩, $Y_M$(k,τ)), the terms independent of $w_1(k)$ are removed, so that the cost function can be expressed by Mathematical Formula 6 of which is the target speech extraction method based on the independent component analysis (DC ICA).

[Mathematical Formula 6]

$$I'_{ICA}(W) = -\sum_{k=1}^{K} \left\{ \log \left| \sum_{m=1}^{M} \Gamma_k^{m-1} [w_1^H(k)]_m \right| + E[\log q(Y_1(k, \tau))] \right\}$$

Herein, $[\cdot]_m$ denotes an m-th element of a vector.

In addition, it may be worth considering the method for target speech extraction based on Independent Vector Analysis (DC IVA) in which the cost function using $\hat{y}_m(\tau)=[Y_m(1,\tau), Y_m(2,\tau), \cap\cap\cap, Y_m(K,\tau)]^T$ in consideration of the dependency between frequency components sets as follows.

[Mathematical Formula 7]

$$I'_{IVA}(W) = -\log\left|\sum_{m=1}^{M}\Gamma_k^{m-1}\left[w_1^H(k)\right]_m\right| - E[\log q(y_1(\tau))]$$

Because the above-mentioned DC ICA and DC IVA methods converge by using maximum gradient algorithm, there is a trade-off between the convergence velocity due to the step size of learning rate and the stability.

On the other hand, the target speech extraction method using auxiliary function sets the auxiliary function Q and is able to minimize fast without need for setting suitably the step size of learning rate. The auxiliary function Q may be set the inequality relation using an inequality $$G_R(r) \leq \frac{G'_R(r_0)}{2r_o}r^2 + G_R(r_0) - \frac{r_0 G'_R(r_0)}{2}$$

so that the auxiliary function has always values greater than or same as that of the objective function.

Accordingly, through the optimization of the auxiliary function, the objective function which has always a value smaller than or same as that of the auxiliary function may be optimized along with it.

In the DC ICA method, the relationship between the auxiliary function and the objective function is as follows.

[Mathematical Formula 8]

$$I'_{ICA} \leq Q = E\left[\sum_{k=1}^{K}\frac{G'(r_1(k,\tau))}{2r_1(k,\tau)}|Y_1(k,\tau)|^2\right] - $$

$$\log\left|\sum_{m=1}^{M}\Gamma_k^{m-1}\left[w_1^H(k)\right]_m\right| + R = \frac{1}{2}w_1^H(k)V_1(k)w_1(k) - \log\left|\sum_{m=1}^{M}\Gamma_k^{m-1}\left[w_1^H(k)\right]_m\right| + R$$

Here, his a constant irrelevant to the estimated vector $w_1(k)$. In the DC ICA method, $V_m(k)$ is as follows.

[Mathematical Formula 9]

$$V_m(k) = E\left[\frac{G'(r_m(k,\tau))}{r_m(k,\tau)}x(k,\tau)x^H(k,\tau)\right]$$

Here, $r_m(k,\tau)=|Y_m(k,\tau)|=|w_m^H(k)x(k,\tau)|$, and $G'(r_m(k,\tau))$ denotes a differentiation of $G(r_m(k,\tau))=-\log q(Y_m(k,\tau))$ by $r_m(k,\tau)$.

Meanwhile, it can be expressed a probability density function of various speech sources in the time-frequency domain by modeling $G'(r_m(k,\tau))$ as a probability density function following the Generalized Gaussian distribution expressed by Mathematical Formula 10.

[Mathematical Formula 10]

$$p(Y_m(k,\tau)) \propto \frac{1}{\lambda_m(k,\tau)}\exp\left\{-\left(\frac{|Y_m(k,\tau)|^2}{\lambda_m(k,\tau)}\right)^\beta\right\}$$

Herein, $\lambda_m(k,\tau)$ and $\beta$ are variance and shape parameter, respectively, and the type of pdf can be determined according to the value of these parameters. For example, if the pdf is a Laplace distribution with a unit variance, $$\beta = \frac{1}{2}$$

and $\lambda_m(k,\tau)=1$, and if the pdf is a Gaussian distribution, then $\beta=1$.

In addition, in the DC IVA method, the extended probability density function using clique may be used as follows.

[Mathematical Formula 11]

$$p(\hat{y}_m(\tau)) \propto \frac{1}{\prod_{c=1}^{N_c}\lambda_m(c,\tau)}\exp\left\{-\sum_{c=1}^{N_c}\left(\frac{\sum_{k\in\Omega_c}|Y_m(k,\tau)|^2}{\lambda_m(c,\tau)}\right)^\beta\right\}$$

Herein, c, $N_c$ and $\Omega_c$ are a clique index, a quantity of the clique and a set of frequency bin included in the corresponding clique, respectively. Also, $\lambda_m(c,\tau)$ and $\beta$ are a variance and a shape parameter of the c-th clique in the m-th output, respectively. Herein, it can be expressed the probability density function of various kinds according to a design of the clique structure and a setting of the shape parameter and the variance.

Also, in the DC IVA method based on the clique, the relationship between the objective function and the auxiliary function is as follows.

[Mathematical Formula 12]

$$I'_{IVA} \leq Q = E\left[\sum_{c=1}^{N_c}\left(\frac{\sum_{k\in\Omega_o}|Y_1(k,\tau)|^2}{\lambda_1^\beta(c,\tau)}\right)^\beta\right] - $$

$$\log\left|\sum_{m=1}^{M}\Gamma_k^{m-1}\left[w_1^H(k)\right]_m\right| + R = $$

$$\frac{1}{2}w_1^H(k)V_1(k)w_1(k) - \log\left|\sum_{m=1}^{M}\Gamma_k^{m-1}\left[w_1^H(k)\right]_m\right| + R$$

Therefore, $V_m(k)$ is given as follows.

[Mathematical Formula 13]

$$V_m(k) = $$

$$E\left[\sum_{c=1}^{N_c}\frac{\left(\sum_{k\in\Omega_o}|Y_m(k,\tau)|^2\right)^{\beta-1}}{\lambda_m^\beta(c,\tau)}x(k,\tau)_{x^H}(k,\tau)\right]$$

To optimize the auxiliary function Q to $w_1(k)$, $w_1(k)$ satisfying the mathematical formula 14 is obtained.

[Mathematical Formula 14]
$$\frac{\partial}{\partial w_1^*(k)} Q = \frac{1}{2} V_1(k) w_1(k) - \frac{\partial}{\partial w_1^*(k)} \log \left| \sum_{m=1}^{M} \Gamma_k^{m-1} [w_1^H(k)]_m \right| = 0$$

Therefore, $w_1(k)$ is satisfied the mathematical formula 15.

$$W(k) V_1(k) w_1(k) = e_1 \quad \text{[Mathematical Formula 15]}$$

Herein, $e_m$ is a vector of which the m-th component only is 1 and the other components are all 0. Therefore, $w_1(k)$ satisfies the following mathematical formula 16.

$$w_1(k) = (W(k) V_1(k))^{-1} e_1 \quad \text{[Mathematical Formula 16]}$$

$w_1(k)$ may be normalized according to the mathematical formulas 17 or 18 as follows.

[Mathematical Formula 17]
$$w_1(k) = \frac{w_1(k)}{\sqrt{w_1^H(k) V_1(k) w_1(k)}}$$

[Mathematical Formula 18]
$$w_1(k) = \frac{w_1(k)}{\sqrt{w_1^H(k) w_1(k)}}$$

In addition, suppose that $\lambda_m(k,\tau)$ is a variance of varying according to time or frequency, the method for estimating the $\lambda_m(k,\tau)$ can be proposed variously.

For example, $$\lambda_m(k, \tau) = \beta^{\frac{1}{\beta}} |Y_m(k, \tau)|^2$$

can be estimated through the likelihood maximization algorithm, or $$\lambda_m(k, \tau) = \beta \left( \frac{|Y_m(k, \tau)|^2}{\lambda_m(k, \tau)} \right)^{\beta-1} |Y_m(k, \tau)|^2$$

can be estimated through the recursive estimation method, where $\lambda_m(k,\tau)$ in the right side of the equation can be modified to $\lambda_m(k,\tau-1)$.

$$\lambda_m \backslash (k, \tau) = \frac{1}{4} |Y_m(k, \tau)|$$

in the Laplace distribution with $$\beta = \frac{1}{2},$$

and $\lambda_m(k,\tau) = |Y_m(k,\tau)|^2$ in the Gaussian distribution with $\beta=1$.

Also, $\lambda_m(k,\tau)$ can be estimated as the equation of $$\lambda_m(k, \tau) = \frac{\beta^{\frac{1}{\beta}}}{2N_a + 1} \sum_{\tau' = \tau - N_a}^{\tau + N_a} |Y_m(k, \tau')|^2$$

by considering the value of the adjacent time frame and including $N_a$ frames existing on the front and the rear of the current time frame $\tau$, respectively, or $\lambda_m(k,\tau)$ can be estimated as the equation of $$\lambda_m(k, \tau) = \frac{\beta}{2N_a + 1} \sum_{\tau' = \tau - N_a}^{\tau + N_a} \left[ \frac{|w_m^H(k) x(k, \tau')|^2}{\lambda_m(k, \tau')} \right]^{\beta-1} |w_m^H(k) x(k, \tau')|^2$$

through the recursive estimation method, where $\lambda_m(k,\tau)$ in the right side of the equation can be modified to $\lambda_m(k,\tau-1)$.

Similarly, $\lambda_m(k,\tau)$ can be estimated by the recursive equation of $\lambda_m(k,\tau) = \gamma |Y_m(k,\tau)|^2 + (1-\gamma) \lambda_m(k,\tau-1)$, where $\gamma$ denoted a smoothing parameter. Therefore, $\lambda_1(k,\tau)$ and $w_1(k)$ updates repeatedly in turn to be converged.

In addition, due to $Y_1(k,\tau) = w_1^H(k) x(k,\tau)$, $\lambda_1(k,\tau)$ can be initialized by various methods including above mentioned methods through the initial value of $w_1(k)$. If the initial value of $w_1(k)$ is set a unit vector of which the m-th element is 1, the initial value of $\lambda_1(k,\tau)$ can be measured by a power of input signal of an individual microphone. In another method, $\lambda_1(k,\tau)$ can be measured approximately by an improved signal power through the beamformer using DOA.

Also, in a method based of the clique, suppose that $\lambda_m(c,\tau)$ is a variance varying according to time or clique, the method for estimating $\lambda_m(c,\tau)$ can be proposed variously in the same way.

For example, $$\lambda_m(c, \tau) = \left( \frac{\beta}{N_C} \right)^{\frac{1}{\beta}} \left( \sum_{k \in \Omega_c} |Y_m(k, \tau)|^2 \right)$$

can be estimated through the maximum likelihood method, or $$\lambda_m(c, \tau) = \frac{1}{N_C} \left( \frac{\sum_{k \in \Omega_c} |Y_m(k, \tau)|^2}{\lambda_m(c, \tau)} \right)^{\beta-1} \sum_{k \in \Omega_c} |Y_m(k, \tau)|^2$$

can be estimated through the recursive estimation method, where $\lambda_m(c,\tau)$ in the right side of the equation can be modified to $\lambda_m(c,\tau-1)$.

Also, in order to update the steering vector, it is needed that the noise signal being calculated in the dummy channel be updated accurately. Therefore, the Mathematical Formula 5 is replaced as follows:

$$y(k, \tau) = W(k) x(k, \tau) = \begin{bmatrix} w_1^H(k) \\ w_2^H(k) \\ \vdots \\ w_M^H(k) \end{bmatrix} x(k, \tau).$$

Therefore, the output of the dummy channel is expressed as the adaptive matrices $(w_z(k) \ldots w_M(k))$ for the noise output being capable of learning. The target mask for updating the steering vector can be estimated effectively by using the noise output in the dummy channel in addition to the real output in the target channel. In this time, the auxiliary function Q of the Mathematical Formula 12 is changed, as follows:

$$Q = \sum_{m=1}^{M} E\left[\sum_{c=1}^{N_c}\left(\frac{\sum_{k\in\Omega_c}|Y_m(k,\tau)|^2}{\lambda_m^\beta(c,\tau)}\right)^\beta\right] - \log|\det W(k)| + R =$$

$$\frac{1}{2}\sum_{m=1}^{M} w_m^H(k)V_m(k)w_m(k) - \log|\det W(k)| + R$$

In Addition, in the target speech extraction method (DC ICA and DC IVA) using auxiliary function, if the auxiliary function is set with the distortionless constraint which the input and output signals coming from the direction of the target speech using prior information are identical with each other, the scaling indeterminacy of signal which is estimated by a parameter updated in conventional method does not generate fundamentally.

Therefore, it can be obtained the signal having a distortion smaller than the conventional method, without applying the minimum distortion principle MDP to resolve the scaling indeterminacy problem in the conventional method.

If the distortionless constraint $w_1^H(k)h(k)=1$, and nullforming constraint $w_m^H(k)h(k)=0$, (m≠1) are added to the auxiliary function Q, the auxiliary function Q' is given as follows.

[Mathematical Formula 19]

$$Q' = \sum_{m=1}^{M}\left[\frac{1}{2}w_m^H(k)V_m(k)w_m(k) + \alpha\left(w_m^H(k)h(k) - \beta_m\right)\right] - \log|\det W(k)| + R$$

Here, h(k) is a steering vector $[\Gamma_k^0, \Gamma_k^1, \ldots, \Gamma_k^{M-1}]^T$ to a target speech, and $\beta_m$ is 1 in m=1, and 0 in m≠1. To minimize the above extended auxiliary function Q', the estimation equation of $w_1^H(k)$ is given as follows.

[Mathematical Formula 20]

$$w_1(k) = \frac{(W(k)V_1(k))^{-1}e_1}{h^H(k)(W(k)V_1(k))^{-1}e_1}$$

Until now, the method which only $w_1^H(k)$ is estimated repeatedly by using the above equation and the remaining $w_m^H(k)$ is fixed to nullformer was proposed. However, for performance improvement, the remaining $w_m^H(k)$, m≠1 may be estimated repeatedly together by using the mathematical formula 21.

[Mathematical Formula 21]

$$w_m(k) = (W(k)V_m(k))^{-1}e_m$$

$$w_m(k) = \frac{w_m(k)}{\sqrt{w_m^H(k)V_m(k)w_m(k)}} \text{ or,}$$

$$w_m(k) = \frac{w_m(k)}{\sqrt{w_m^H(k)w_m(k)}}$$

By applying the distortionless constraint and the nullforming constraint, the following equation can be satisfied.

$$W(k)h(k)=e_1$$

When $A^{-1}(f)=W(f)$, $A(k)e_1=h(k)$ is given.

By using the equations, the mathematical formula 20 can be rearranged as follows:

$$w_1(k) \leftarrow \frac{(W(k)V_1(k))^{-1}e_1}{h^H(k)(W(k)V_1(k))^{-1}e_1} = \frac{V_1^{-1}(k)h^H(k)}{h^H(k)V_1^{-1}(k)h^H(k)}.$$

The mathematical formula 21 which is expressed the conventional demixing matrix for the dummy channel does not reflect the Lagrange multiplier. Therefore, by reflecting the Lagrange multiplier to apply the null-forming constraint, the mathematical formula 21 can be rearranged as follows:

$$w_m(k) \leftarrow (W(k)V_m(k))^{-1}e_m - \frac{h^H(k)(W(k)V_m(k))^{-1}e_m}{h^H(k)(W(f)V_m(k))^{-1}e_1}(W(k)V_m(k))^{-1}e_1,$$

$$m \leq 2 \leq M.$$

Therefore, the equations are rearranged as follows:

$$u_m(k) = (W(k)V_m(k))^{-1}e_m$$

$$\hat{u}_m(k) = \frac{V_m^{-1}(k)h(k)}{h^H(k)V_m^{-1}(k)h(k)}$$

$$w_m(k) \leftarrow u_m(k) - \left(h^H(k)u_m(k)\right)\hat{u}_m(k).$$

To induce the real time target speech extraction method based on the auxiliary function, if the inverse matrix of $V_m(k)$ in time frame r is denoted $U_m(k;\tau)$ and the inverse matrix of W(k) is denoted $A(k;\tau)$, $U_m(k;\tau)$ can be obtained recursively from $U_m(k;\tau-1)$, as follows.

[Mathematical Formula 22]

$$U_m(k;\tau) = \frac{1}{\alpha}\left(U_m(k;\tau-1) - \frac{p_m(k,\tau)U_m(k;\tau-1)x(k,\tau)x^H(k,\tau)U_m^H(k;\tau-1)}{\alpha + p_m(k,\tau)x^H(k,\tau)U_m^H(k;\tau-1)x(k,\tau)}\right)$$

$$A(k;\tau) = A(k;\tau) - \frac{A(k;\tau)e_m\Delta w_m^H(k;\tau)A(k;\tau)}{1 + \Delta w_m^H(k;\tau)A(k;\tau)e_m}$$

Here, suppose that $w_m(k)$ is $t_m(k;\tau)$ in the time frame τ. In addition, $$p_m(k,\tau) = (1-\alpha)\frac{G'(r_m(k,\tau))}{r_m(k,\tau)} \text{ and}$$

$$\Delta w_m(k;\tau) = w_m(k;\tau) - w_m(k;\tau-1)$$

using forgetting factor α. Therefore, $w_1(k;\tau)$ can be estimated as follows.

$$w_1(k;\tau)=U_1(k;\tau)A(k;\tau)e_1 \quad \text{[Mathematical Formula 23]}$$

As occasion demands, the norming is performed.

In order to resolve scaling indeterminacy of the output signal by applying a minimal distortion principle (MDP) to the obtained output $Y_1(k,\tau)$ $w_1^H(k;\tau)x(k,\tau)$ obtained by using the $w_1(k;\tau)$, the diagonal elements of an inverse matrix of a separating matrix needs to be obtained.

Due to the structural features, the inverse matrix $$\begin{bmatrix} w_1^H(k;\tau) \\ -\gamma_k|I \end{bmatrix}^{-1}$$

of the above-described matrix can be simply obtained by calculating only a factor $$1 / \sum_{m=1}^{M} \Gamma_k^{m-1} [w_1^H(k;\tau)]_m$$

for the target output and multiplying the factor to the output.

The real time target speech extraction method which the distortionless constraint and nullforming constraint are added to the auxiliary function is exchanged to the mathematical formula 24 from the mathematical formula 10.

$$w_1(k;\tau) = \frac{U_1(k;\tau)A(k;\tau)e_1}{h^H(k)U_1(k;\tau)A(k;\tau)e_1}$$ [Mathematical Formula 24]

If $w_m^H(k;\tau)$, $m \neq 1$ is estimated repeatedly, the following mathematical formula.

$$w_m(k;\tau) = U_m(k;\tau)A(k;\tau)e_m$$ [Mathematical Formula 25]

$$w_m(k;\tau) = \frac{w_m(k;\tau)}{\sqrt{w_m^H(k;\tau)V_m(k;\tau)w_m(k;\tau)}} \text{ or,}$$

$$w_m(k;\tau) = \frac{w_m(k;\tau)}{\sqrt{w_m^H(k;\tau)w_m(k;\tau)}}$$

Similarly, by arranging mathematical formula 21, the adaptive vector (m=1) for the target channel can be expressed as follow:

$$w_1(k;\tau) \leftarrow \frac{U_1(k;\tau)h^H(k;\tau)}{h^h\{k;\tau\}U_1(k;\tau)h^H(k;\tau)}.$$

By reflecting the Lagrange Multiplier and arranging the mathematical formula 25, the adaptive vector $2 \leq m \leq M$ for the noise channel can be expressed as follow:

$$u_m(k;\tau) = U_m(k;\tau)A(k;\tau)e_m$$

$$\hat{u}_m(k;\tau) = \frac{U_m(k;\tau)h^H(k;\tau)}{h^H(k;\tau)U_m(k;\tau)h^H(k;\tau)}$$

$$w_m(k;\tau) \leftarrow u_m(k;\tau) - (h^H(k;\tau)u_m(k;\tau))\hat{u}_m(k;\tau).$$

Next, a time domain waveform of the estimated target speech signal can be reconstructed by Mathematical Formula 26.

$$y(t) = \sum_r \sum_{k=1}^{K} Y_1(k,\tau)e^{j\omega_k(t-\tau H)}$$ [Mathematical Formula 26]

Figure 2:
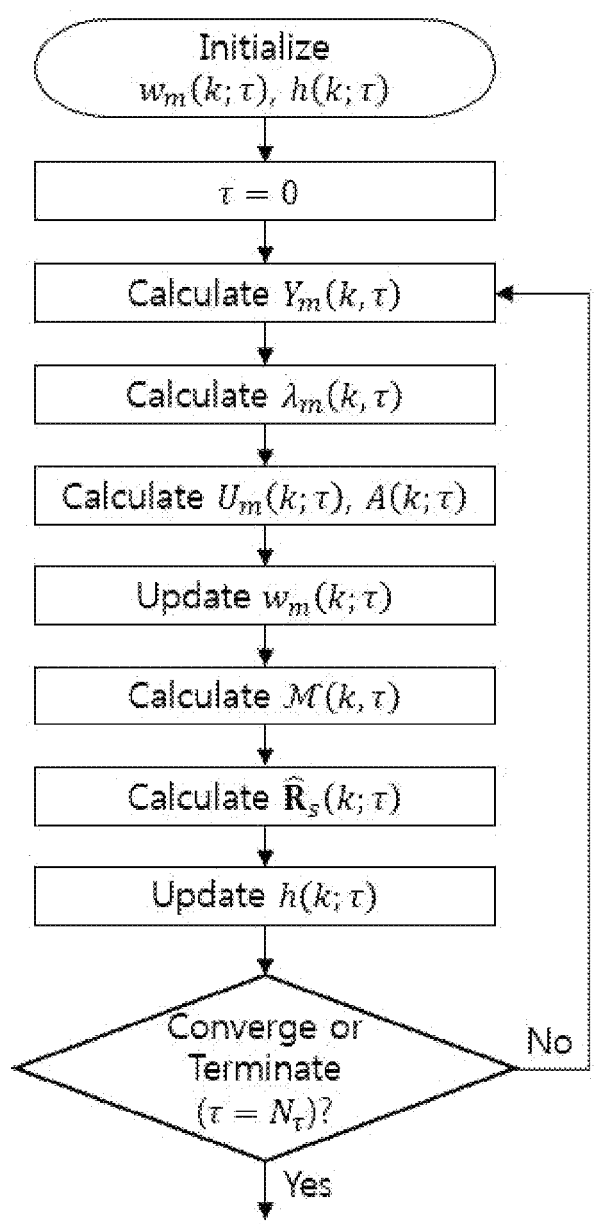
FIG. 2 is a flowchart sequentially illustrating an algorithm according to a target speech extraction method for robust speech recognition according to the present invention.

FIG. 2 is a flowchart illustrating sequentially the procedure of algorithm of the target speech extraction method according to the present invention.

Figures 3, 4:
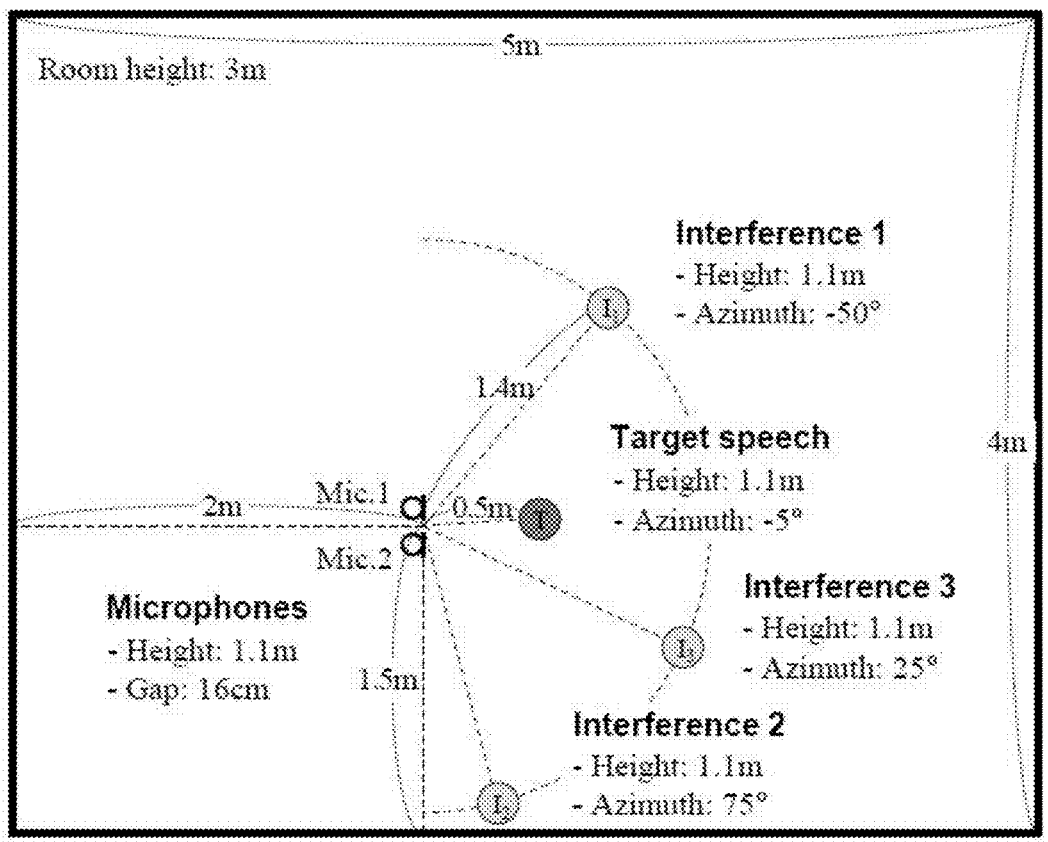
FIG. 3 is a table illustrating comparison of calculation amounts required for processing one data frame between a method according to the present invention and a real-time FD ICA method of the related art.
FIG. 4 is a configurational diagram illustrating a simulation environment configured in order to compare performance between the method according to the present invention and methods of the related art.

FIG. 3 is a table illustrating comparison of calculation amounts required for calculating values of the first column of one data frame between a method according to the present invention and a real-time FD ICA method of the related art.

In FIG. 3, M denotes the number of input signals as the number of microphones. K denotes frequency resolution as the number of frequency bins. O(M) and O($M^3$) denotes a calculation amount with respect to a matrix inverse transformation. It can be understood from FIG. 3 that the method of the related art requires more additional computations than the method according to the present invention in order to resolve the permutation problem and to identify the target speech output.

Figure 5A:
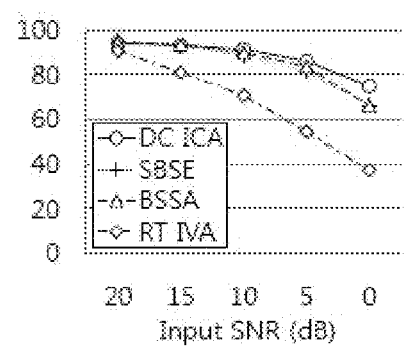
FIGS. 5A to 5I are graphs illustrating results of simulation of the method according to the present invention (referred to as 'DC ICA'), a first method of the related art (referred to as 'SBSE'), a second method of the related art (referred to as 'BSSA', and a third method of the related art (referred to as 'RT IVA') while adjusting the number of interference speech sources under the simulation environment of FIG. 4.
Figure 5B:
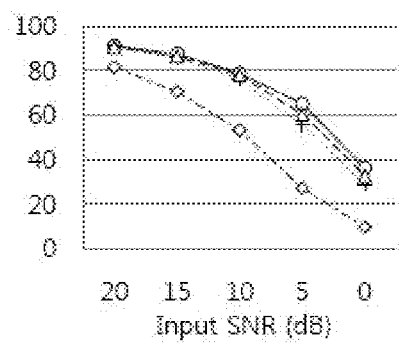
Figure 5C:
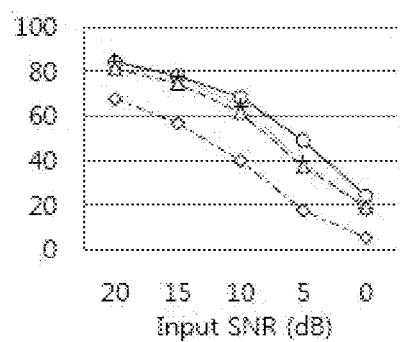
Figure 5D:
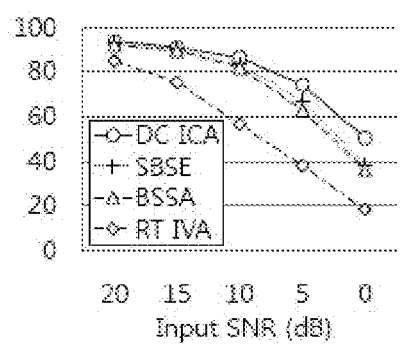
Figure 5E:
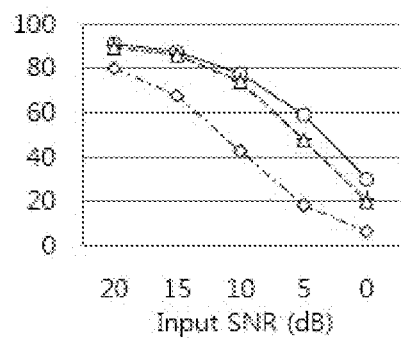
Figure 5F:
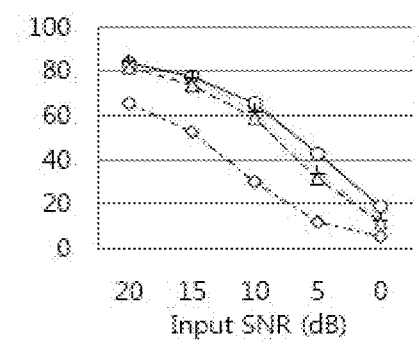
Figure 5G:
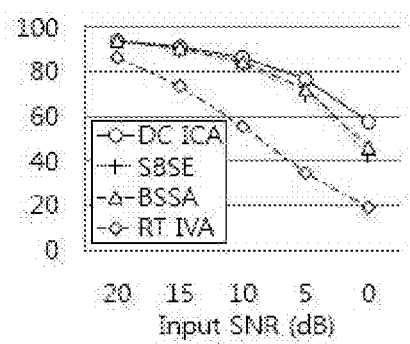
Figure 5H:
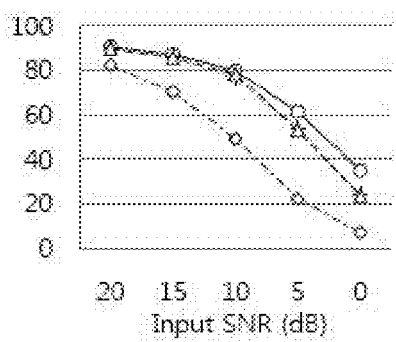
Figure 5I:
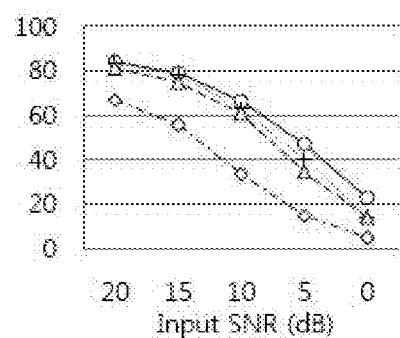

FIG. 4 is a configurational diagram illustrating a simulation environment configured in order to compare performance between the method according to the present invention and methods of the related art. Referring to FIG. 4, there is a room having a size of 3 m×4 m where two microphones Mic.1 and Mic.2 and a target speech source T are provided and three interference speech sources Interference 1, Interference 2, and Interference 3 are provided. FIGS. 5A to 5I are graphs of results of simulation of the method according to the present invention (referred to as 'DC ICA'), a first method of the related art (referred to as 'SBSE'), a second method of the related art (referred to as 'BSSA', and a third method of the related art (referred to as 'RT IVA') while adjusting the number of interference speech sources under the simulation environment of FIG. 4. FIG. 5A illustrates a case where there is one interference speech source Interference 1 and $RT_{60}$=0.2 s. FIG. 5b illustrates a case where there is one interference speech source Interference 1 and $RT_{60}$=0.4 s. FIG. 5C illustrates a case where there is one interference speech source Interference 1 and $RT_{60}$=0.6 s. FIG. 5D illustrates a case where there are two interference speech sources Interference 1 and Interference 2 and $RT_{60}$=0.2 s. FIG. 5E illustrates a case where there are two interference speech sources (Interference 1 and Interference 2 and $RT_{60}$=0.4 s. FIG. 5F illustrates a case where there are two interference speech sources (Interference 1 and Interference 2 and $RT_{60}$=0.6 s. FIG. 5G illustrates a case where three are two interference speech sources Interference 1, Interference 2, and Interference 3 and $RT_{60}$=0.2 s. FIG. 5H illustrates a case where three are two interference speech sources Interference 1, Interference 2, and Interference 3 and $RT_{60}$=0.4 s. FIG. 5I illustrates a case where three are two interference speech sources Interference 1, Interference 2, and Interference 3 and $RT_{60}$=0.6 s. In each graph, the horizontal axis denotes an input SNR (dB), and the vertical axis denotes word accuracy (%).

It can be easily understood from FIGS. 5A to 5I that the accuracy of the method according to the present invention is higher than those of the methods of the related art.

Figure 6A:
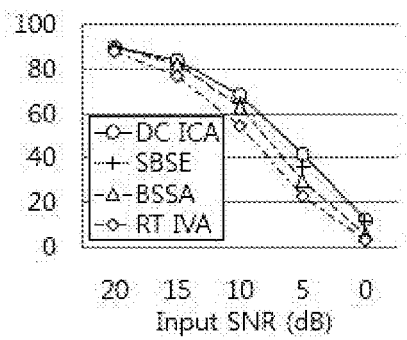
FIGS. 6A to 6I are graphs of results of simulation the method according to the present invention (referred to as 'DC ICA'), the first method of the related art (referred to as 'SBSE'), a second method of the related art (referred to as 'BSSA'), and a third method of the related art (referred to as 'RT IVA') by using various types of noise samples under the simulation environment of FIG. 4.
Figure 6B:
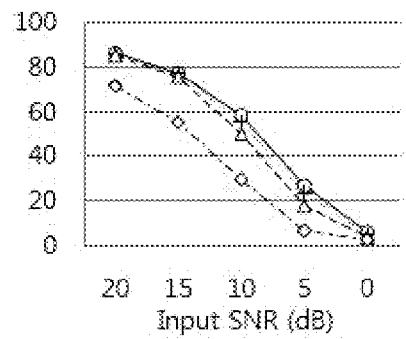
Figure 6C:
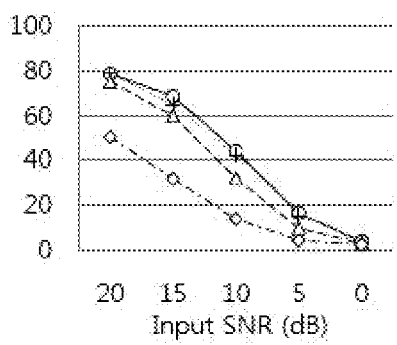
Figure 6D:
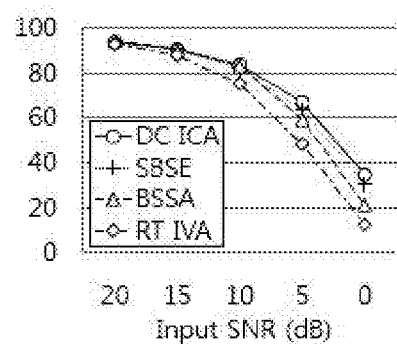
Figure 6E:
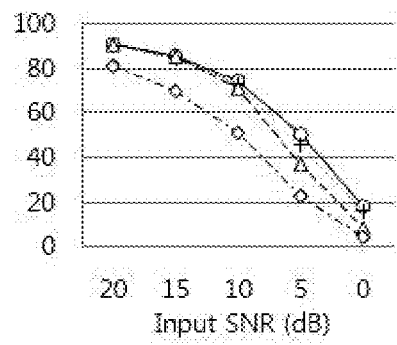
Figure 6F:
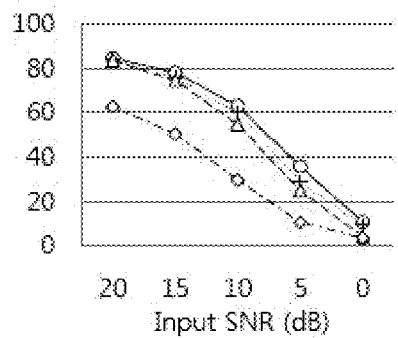
Figure 6G:
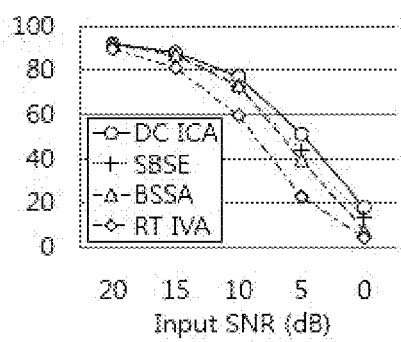
Figure 6H:
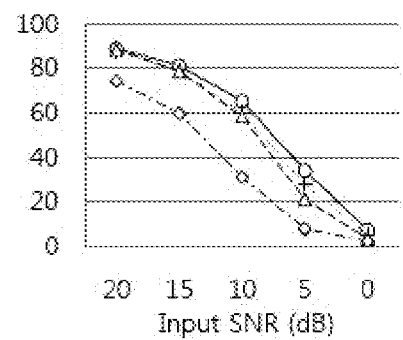
Figure 6I:
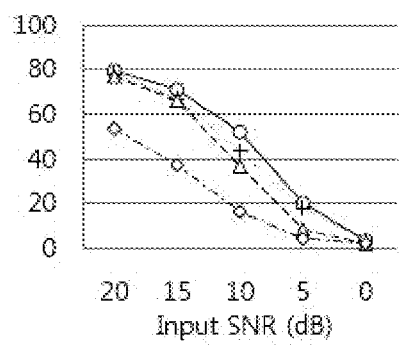

FIGS. 6A to 6I are graphs of results of simulation the method according to the present invention (referred to as 'DC ICA'), the first method of the related art (referred to as 'SBSE'), a second method of the related art (referred to as 'BSSA'), and a third method of the related art (referred to as 'RT IVA') by using various types of noise samples under the simulation environment of FIG. 4. FIG. 6A illustrates a case of subway noise and R $T_{60}$=0.2 s. FIG. 6B illustrates a case of subway noise and R $T_{60}$=0.4 s. FIG. 6C illustrates a case of subway noise and R $T_{60}$=0.6 s. FIG. 6D illustrates a case of car noise and R $T_{60}$=0.2 s. FIG. 6E illustrates a case of car noise and R $T_{60}$=0.4 s. FIG. 6F illustrates a case of car noise and R $T_{60}$=0.6 s. FIG. 6G illustrates a case of exhibition hall noise and R $T_{60}$=0.2 s. FIG. 6H illustrates a case of exhibition hall noise and R $T_{60}$=0.4 s. FIG. 6I illustrates a case of exhibition hall noise and R $T_{60}$=0.6 s. In each graph, the horizontal axis denotes an input SNR (dB), and the vertical axis denotes word accuracy (%).

It can be easily understood from FIGS. 6A to 6I that the accuracy of the method according to the present invention is higher than those of the methods of the related art with respect to all kinds of noise.

Figure 7A:
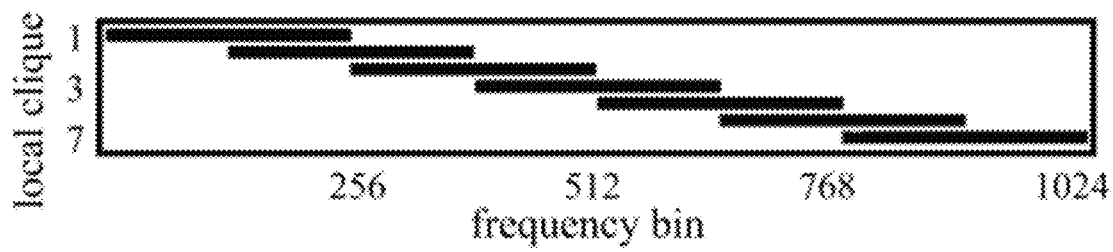
FIGS. 7A and 7B illustrate a subband clique and a harmonic clique as two typical clique cases.
Figure 7B:
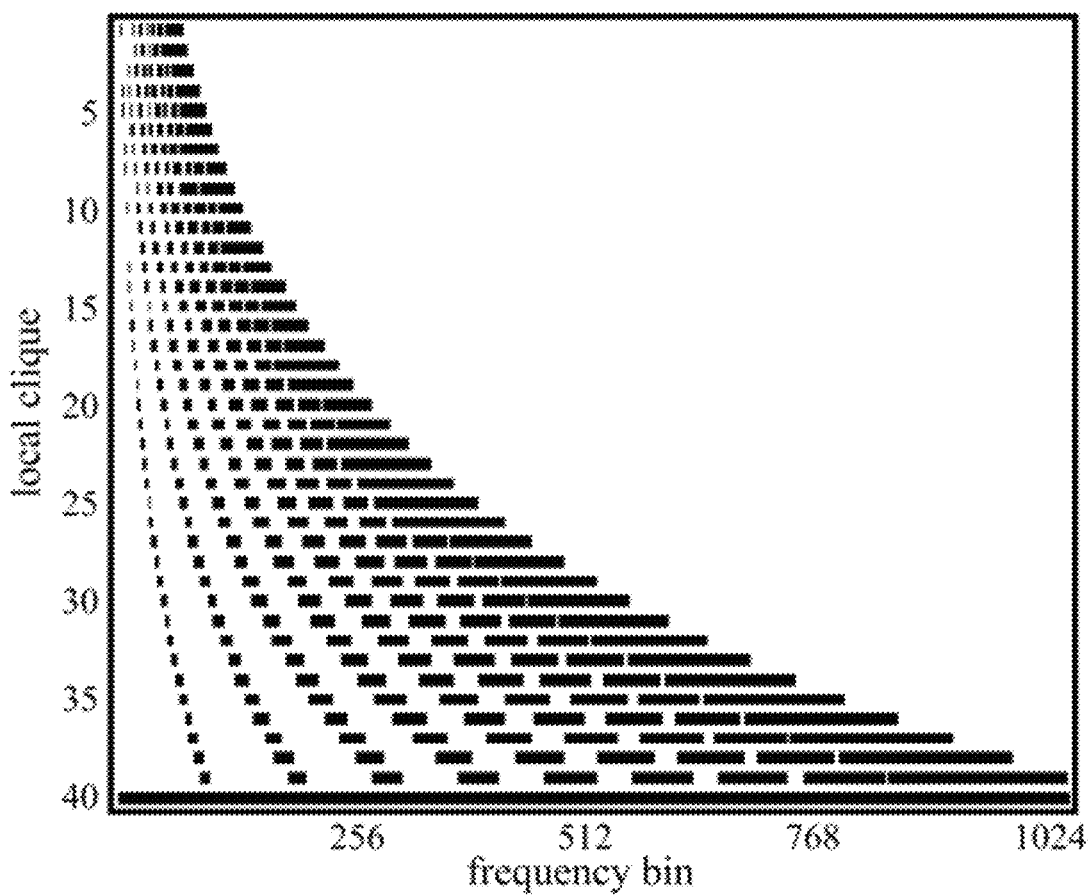

FIGS. 7A and 7B illustrate a subband clique and a harmonic clique as two typical clique cases.

While the present invention has been particularly shown and described with reference to exemplary embodiments thereof, it will be understood by those skilled in the art that various changes in form and details may be made therein without departing from the spirit and scope of the present invention as defined by the appended claims.

A target speech signal extraction method according to the present invention can be used as a pre-processing method of a speech recognition system.

What is claimed is:

1. A target speech signal extraction method of extracting a target speech signal from input signals input to at least two or more microphones for robust speech recognition, by a processor of a speech recognition apparatus, comprising:
    (a) initializing a steering vector for a target speech source and an adaptive vector ($w_1(k)$) for the target speech source, setting a real output channel of the target speech source as an output by the adaptive vector for the target speech source, initializing adaptive vectors ($w_2(k), \ldots, w_M(k)$) for a noise and setting a dummy channel as an output by the adaptive vectors for the noise;
    (b) setting a cost function for minimizing dependency between a real output for the target speech source and a dummy output for the noise using independent component analysis (ICA) or independent vector analysis (IVA);
    (c) setting an auxiliary function to the cost function, and updating the adaptive vector ($w_1(k)$) for the target speech source and the adaptive vectors ($w_2(k), \ldots, w_M(k)$) for the noise by using the auxiliary function and the steering vector for the target speech source;
    (d) estimating the target speech signal by using the adaptive vector for the target speech source thereby extracting the target speech signal from the input signals; and
    (e) updating the steering vector for the target speech source;
    wherein the (b)~(e) are performed repeatedly; and
    wherein the auxiliary function is set an inequality relation so that the auxiliary function has always values greater than or same as that of the cost function.

2. The target speech signal extraction method according to claim 1, wherein the (e) includes of
    (e1) estimating a target mask which is defined a value representing a ratio of a target speech signal power to a sum of the target speech signal power and a noise signal power;
    (e2) estimating a covariance matrix for the target speech source by using the estimated target mask;
    (e3) obtaining a principal eigen vector by eigen-vector decomposing the estimated covariance matrix; and
    (e4) estimating the steering vector from the principal eigen vector to update the steering vector.

3. The target speech signal extraction method according to claim 1,
    Wherein the (b) sets a condition in which a value of multiplying the steering vector and an input signal of a microphone becomes 1 in an output of the target speech and becomes 0 in the dummy output, and reflects the condition to the auxiliary function.

4. The target speech signal extraction method according to claim 1,
    wherein a probability density function of the cost function is modeling by a generalized Gaussian distribution.

5. The target speech signal extraction method according to claim 4,
    wherein the generalized gaussian distribution has a varying variance with regard to time-frequency or one of time and frequency, and
    wherein the (c) includes of updating alternately the varying variance $\lambda$, the adaptive vector ($w_1(k)$) for the target speech source and the adaptive vectors ($w_2(k), \ldots, w_M(k)$) for the noise by using the auxiliary function, and estimating the target speech source by using the updated adaptive vectors.

6. The target speech signal extraction method according to claim 4,
    wherein the generalized gaussian distribution has a constant variance, and
    wherein the (d) includes of learning the cost function to update the adaptive vector ($w_1(k)$) and estimating the target speech source by using the updated adaptive vector.

7. The target speech signal extraction method according to claim 2, the (e1) includes of:
    applying a minimal distortion principle (MDP) using a target speech element of a diagonal elements in an inverse matrix of a separating matrix to the adaptive vectors for target speech source and noise estimated in the (c); and
    estimating a power of the target speech signal and noise signal by using the separating matrix and estimating the target mask by using the estimated power.

8. The target speech signal extraction method according to claim 1,
    wherein a time domain waveform y(t) of an estimated target speech signal is expressed by the following Mathematical Formula, $$y(t) = \sum_{\tau} \sum_{k=1}^{K} Y_i(k, \tau) e^{j\omega_k(t-\tau H)},$$

and
    wherein $Y_1(k,\tau)=w_1(k)x(k,\tau)$, $w_1(k)$ denotes an adaptive vector for generating a real output for the target speech source, and k and $\tau$ denote a frequency bin number and a frame number, respectively.

9. A non-transitory computer readable storage media having program instructions that, when executed by a processor of a speech recognition apparatus, cause the processor to perform the target speech signal extraction method according to claim 1.

* * * * *